(12) United States Patent
Hanses et al.

(10) Patent No.: US 10,322,891 B2
(45) Date of Patent: Jun. 18, 2019

(54) UNLOADING SYSTEM FOR BULK MATERIAL FROM A TRANSPORT VESSEL, IN PARTICULAR A CONTAINER

(71) Applicant: Pool Invest GmbH, Sessenhausen (DE)

(72) Inventors: Christian Hanses, Hilgert (DE); Roland Sitta, Asbach (DE)

(73) Assignee: Pool Invest GmbH, Sessenhausen (DE)

( * ) Notice: Subject to any disclaimer, the term of this patent is extended or adjusted under 35 U.S.C. 154(b) by 448 days.

(21) Appl. No.: 14/372,468

(22) PCT Filed: Sep. 12, 2013

(86) PCT No.: PCT/EP2013/068955
§ 371 (c)(1),
(2) Date: Jul. 16, 2014

(87) PCT Pub. No.: WO2014/048764
PCT Pub. Date: Apr. 3, 2014

(65) Prior Publication Data
US 2014/0356108 A1 Dec. 4, 2014

(30) Foreign Application Priority Data
Sep. 29, 2012 (DE) .................. 10 2012 109 292

(51) Int. Cl.
*B65G 65/46* (2006.01)
*B65G 69/18* (2006.01)
(Continued)

(52) U.S. Cl.
CPC ............. *B65G 65/46* (2013.01); *B65D 88/68* (2013.01); *B65D 90/046* (2013.01); *B65G 69/181* (2013.01); *B65D 2590/046* (2013.01)

(58) Field of Classification Search
CPC ...... B65G 65/46; B65G 69/181; B65D 88/68; B65D 90/046; B65D 2590/046
(Continued)

(56) References Cited

U.S. PATENT DOCUMENTS 1,820,610 A * 8/1931 Eves ...................... B01D 23/28
141/297
3,472,178 A * 10/1969 Floehr ...................... B61D 7/22
105/282.1
(Continued)

FOREIGN PATENT DOCUMENTS

DE 1556139 A1 9/1969
DE 4114117 A1 11/1992
WO 1980001793 A1 9/1980

*Primary Examiner* — Saul Rodriguez
*Assistant Examiner* — Ashley K Romano
(74) *Attorney, Agent, or Firm* — Michael Soderman

(57) ABSTRACT

The invention relates to an unloading system for bulk material from a transport vessel (4), in particular a container, into a silo or another hopper. With this system, the unloading process of the bulk material is easier, more cost-efficient, less time-consuming, more effective, contamination-free and emission-free. To do so, a basic frame (2) is provided which can be fixed to the transport vessel (4) to be unloaded. A screw trough (7) which can be shifted and locked horizontally, with a worm drive (8) as well as a pressurizable dust seal (12) between the screw trough (7) and the unloading opening of the transport vessel (4), are arranged on the basic frame (2). Moreover, a dosing device (11) for dosing the bulk material to be delivered and transport brackets (14) for forklift trucks are provided on the screw trough (7). The unloading device (1) is connected to the transport vessel (4) to be unloaded in such a way that the dust seal (12) is connected in a dust-proof manner to a flexible discharge device (17) of a container liner (14) and thereby forms a dual gasket.

9 Claims, 3 Drawing Sheets

(51) Int. Cl.
*B65D 88/68* (2006.01)
*B65D 90/04* (2006.01)

(58) Field of Classification Search
USPC .................................................. 414/292, 526
See application file for complete search history.

(56) References Cited

U.S. PATENT DOCUMENTS

| | | | | |
|---|---|---|---|---|
| 3,756,469 | A * | 9/1973 | Clark | B61D 3/06 |
| | | | | 105/243 |
| 3,773,221 | A * | 11/1973 | Lesk | B65B 1/18 |
| | | | | 222/226 |
| 4,363,291 | A * | 12/1982 | Harmsen | 119/51.02 |
| 5,555,842 | A * | 9/1996 | Chocola et al. | 119/51.11 |
| 2005/0184103 | A1* | 8/2005 | Palma et al. | 222/413 |
| 2006/0043115 | A1* | 3/2006 | Tanaka et al. | 222/181.1 |
| 2008/0264963 | A1* | 10/2008 | Teodorescu | 221/4 |
| 2009/0032555 | A1* | 2/2009 | Peterson | 222/226 |
| 2010/0065149 | A1* | 3/2010 | O'Callaghan | 141/98 |

* cited by examiner

UNLOADING SYSTEM FOR BULK MATERIAL FROM A TRANSPORT VESSEL, IN PARTICULAR A CONTAINER

CROSS REFERENCE TO RELATED APPLICATIONS

This application is the U.S. national stage of International Application No. PCT/EP2013/068955 filed on Sep. 12, 2013, and claims the benefit thereof. The international application claims the benefit under 35 USC 119 of German Application No. DE 102012109292.3 filed on Sep. 29, 2012; all applications are incorporated by reference herein in their entirety.

BACKGROUND

The invention relates to an unloading system for bulk material from a transport vessel, in particular a container, into a silo or another hopper.

Bulk goods have long been transported in standardised containers. The purpose is now to fill bulk goods in standardised loading devices and to convey them for transport on lorries, rail or ships. Containers are particularly suitable as loading devices. These containers are large capacity vessels for storing and for transporting goods which are of robust construction and sufficiently resistant to enable repeated use by several transporting and conveying means without transshipping the content. Such containers exist in many different sizes and are usually standardised.

The containers have moreover devices such as domed lids, discharge flaps and/or grains sliders, for easy transfer from one transport vessel to the other. The so-called ISO standard containers are the best known and the most widely used. These are mostly 20, 30 or 40-foot ship containers as well as swap-body systems. They enable to handle a major portion of merchandises and general cargo. The advantage lies in that the containers can be conveyed and transshipped quickly due to their standardised form and sizes with the most different transport means, such as ships, barges, railway cars and lorries.

Bulk material is often stored in silos and bunkers from which it can be removed and filled into such containers. Typical bulk materials are building materials such as top soil, sand, gravel, grit, cement, other mineral goods such as ore, road salt, and foodstuffs such as grain, sugar, food grade salt, coffee, flour as well as powdered goods such as pigments, filling materials, granules, pellets etc.

In terms of transport, we distinguish between continuous, uninterrupted flowing transport, for instance troughed belt conveyors and bucket conveyors as well as pneumatically fluid transport in air flows, For instance in bulk material compartments or bulk material bunkers of ships, in troughed and high fence vehicles, silo vehicles, lorries, railway wagons, etc. In bags, big bags, bulk ships, bulk containers and similar as transport vessels for light, individual goods or bulk goods.

Containers are usually cladded with a synthetic inliner, so-called container liner, which encloses the bulk material. Said container liner can be depressurised or pressurised and consequently prevents the destruction of the bulk material due to ist own humidity, as well as protects it against overheating, frost, contamination and attacks from parasites.

The transshipping and transport of bulk material is a costly and manifold process. To do so, the bulk material can be transported and unloaded as follows:

The bulk material is loaded on tipper trucks, for example railway wagons. They are then transported to another location and transshipped onto a loose goods ship. Said ship again travels to another location where the bulk material is packed in relatively small packs. Said sacks are palletised and again transported to another location, by means of lorries, railway wagons etc. to the end-user. The end-user may then store the bulk material delivered in sacks in a high silo, for example or send it directly for further processing. To do so, the sacks are slit and brought to the high silo.

A shortcoming of these multiple transshipments is the great risk of contaminating the bulk material or of mixing packaging components with the material when extracting it from its package.

SUMMARY

The invention relates to an unloading system for bulk material from a transport vessel (4), in particular a container, into a silo or another hopper. With this system, the unloading process of the bulk material is easier, more cost-efficient, less time-consuming, more effective, contamination-free and emission-free. To do so, a basic frame (2) is provided which can be fixed to the transport vessel (4) to be unloaded. A screw trough (7) which can be shifted and locked horizontally, with a worm drive (8) as well as a pressurisable dust seal (12) between the screw trough (7) and the unloading opening of the transport vessel (4), are arranged on the basic frame (2). Moreover, a dosing device (11) for dosing the bulk material to be delivered and transport brackets (13) for forklift trucks are provided on the screw trough (7). The unloading device (1) is connected to the transport vessel (4) to be unloaded in such a way that the dust seal (12) is connected in a dust-proof manner to a flexible discharge device (17) of a container liner (14) and thereby forms a dual gasket.

DETAILED DESCRIPTION

It is an object of the invention to provide an unloading system of the type above mentioned with which the process of the bulk material can be performed more easily, cheaply, faster, more efficiently and without contamination.

According to the invention, the objective is resolved by an unloading device fitted with a basic frame and possibly an auxiliary frame which can be fixed to the transport vessel to be unloaded, whereas a screw trough with worm drive, trough which can be shifted and locked horizontally with respect to the unloading opening of the transport vessel, a dust seal between the screw trough and the unloading opening of the transport vessel, a dosing device arranged on the screw trough for dosing the bulk material to be delivered and transport brackets for forklift trucks are provided on the basic frame, and that the unloading device is connected to the transport vessel to be unloaded in such a way that the dust seal of the unloading device is connected in a dust-proof manner with a container liner having a flexible discharge device, a container liner which contains the bulk material and is placed in the transport vessel, or connected in a dust-proof manner to an opening of the other transport vessel.

According to another embodiment of the invention, the screw trough is arranged to be horizontally movable or tiltable or pivotable with respect to a guide.

Moreover, that the unloading device is fixed to the transport vessel to be unloaded and the movement of the screw trough is performed pneumatically, hydraulically, electrically or mechanically or in any combination with respect to the guide. Furthermore, the locking and securing systems are arranged between the unloading device and the transport vessel to be unloaded, so as to be operated pneumatically, hydraulically, electrically or mechanically or in any combination.

The flexible discharge device formed on the container liner includes an opening device which is designed as a rip cord, a zip fastener or an equivalent reclosable system, whereas said discharge device can be open and reclosed if needed. The manual or also automatic opening device guarantees the absence of ingress of any packaging components into the material flow. Moreover, the flexible discharge device of the container liner can be designed as a double-wall single use or re-usable hygienic discharge for transferring the bulk material from the transport vessel to the unloading device.

Furthermore, the dust seal is designed as a pressurised gasket, preferably made of hollow rubber or self-adapting gasket, preferably made of solid rubber or a depressurising gasket. It is possible to use a load gasket, an adhesive gasket, a rigid gasket or a welded gasket. Said gasket is placed in the region of the flexible discharge device of the container liner or beyond that to cover the complete opening area of the transport vessel so as to guarantee even in this extreme case an unloading process without emission nor contamination.

This way, the flexible discharge device formed on the container liner and the dust seal arranged between the screw trough and the unloading opening of the transport vessel constitute a double seal during the unloading process and consequently a hermetically locked transfer area of the bulk material from the transport vessel to the unloading device.

According to another embodiment of the unloading system, the unloading device includes a dosing device for easier discharge, which is designed as a rotary feeder, a double-flap batching valve, a suction shoe or another pressurised source vessel. The dosing device improves the flow characteristic of the bulk material by pressure compensation. Moreover, the dosing device enables to increase or to reduce the pressure inside the transport vessel so as to ensure dosed unloading of the bulk material, for example under nitrogen atmosphere. Aeration devices developed for unloading bulk materials by means of pressure waves, also designated as bulk shockers, create in combination with the locks which generate pressure compensation, a sudden pressure change inside the transport vessel which loosens and secures complete unloading of the residual materials even in untiltable transport vessels.

Moreover, the dosed discharge of the bulk material, free of contamination and any emission, guarantees the further processing of the goods to be discharged, for example by microwave drying, fumigation, humidification, upgrading, triage or quality mixing or segregation, impregnation of the bulk good, inclusive of pest control.

The unloading device is fixed directly to a transport vessel, for instance a standard see container, for easier unloading. The unloading device can be fitted on mobile cargo compartments, for example a lorry, depending essentially on the existing chassis of the vehicle. In case of bulk materials which are difficult to handle, the unloading device can stay on location in the customer's premises or accompany the transport vessel and be fixed to the transport vessel for easy unloading of bulk material.

Finally, the unloading device can be connected to the transport vessel to be unloaded in such a way that the dust seal of the unloading device is linked to the flexible discharge device of a separate single wall in a dust-proof manner, similar to the rear wall of a container liner which is fixed to an opening of the transport vessel. This is an ideal solution when the transport vessel does not include any container liner itself.

The unloading of bulk materials which tend to form dust, such as powders, or bulk materials with problematic physical properties, which tend to form bridges or chains or to compact strongly, it is necessary to provide a dustproof connection with the unloading device. This should take place as close to the transport vessel to be unloaded as possible, for easier additional fitting of the discharge fixtures described above.

The discharge device can be adjoined to a transport device, for instance a pallet box, to be folded or retracted separately. It is also possible to fix the unloading device, for example hydraulically on the rear end of the chassis and in case of need to make it pivot to the transport vessel to be unloaded, for example a container or a lorry trailer. The unloading device can also pushed or suspended below the chassis of the lorry by means of a forklift truck.

For road transport, the unloading device is fitted with a lighting equipment to respect the road traffic regulations, so as to protect the overhanging material and to provide an underride guard, which can be part of special fixtures of the unloading system. These fixtures can be foldable, insertable or slidable and adjustable pneumatically, hydraulically, electrically or mechanically. They can be brought to the electrical installation of the vehicle providing the mobility preferably via standardised electrical, pneumatic or hydraulic connections as well as dual system.

With the unloading device, the whole width of the transport vessel can be used as a discharge area, to realise the largest possible opening and to provide a regular chute for the bulk material. During the unloading process, the bulk material can be blown in directly into a high silo, a deep bunker in packaging units or guided to further treatment facilities. This enables to save enormous costs and time when unloading the bulk material, especially in terms of transport routes and transshipment processes. To do so, the transport vessel, such as containers, wagons, trailers etc. can be not only the means of transport but also the packaging simultaneously. The savings in logistic costs amount to approx. 45% and in time approx. 75% with respect to conventional logistic methods.

The unloading system also enables to respect the hygiene regulations for the pharmaceutical, mineral and chemical industry.

Inspection glasses on the unloading device as well as integrated weighing and flow rate measuring facilities enable the unloading system to discharge the bulk material in portions, before direct connection to existing packaging or production processes.

It goes with saying that the features aforementioned and those still to be explained below cannot solely be applied in the given combination, but also in other combinations or individually, without departing from the framework of the present invention.

BRIEF DESCRIPTION OF THE DRAWINGS

The idea behind the invention is described more in detail in the following description using an embodiment example illustrated on the drawing. The figures are as follows.

DETAILED DESCRIPTION OF THE PREFERRED EMBODIMENT

Figure 1:
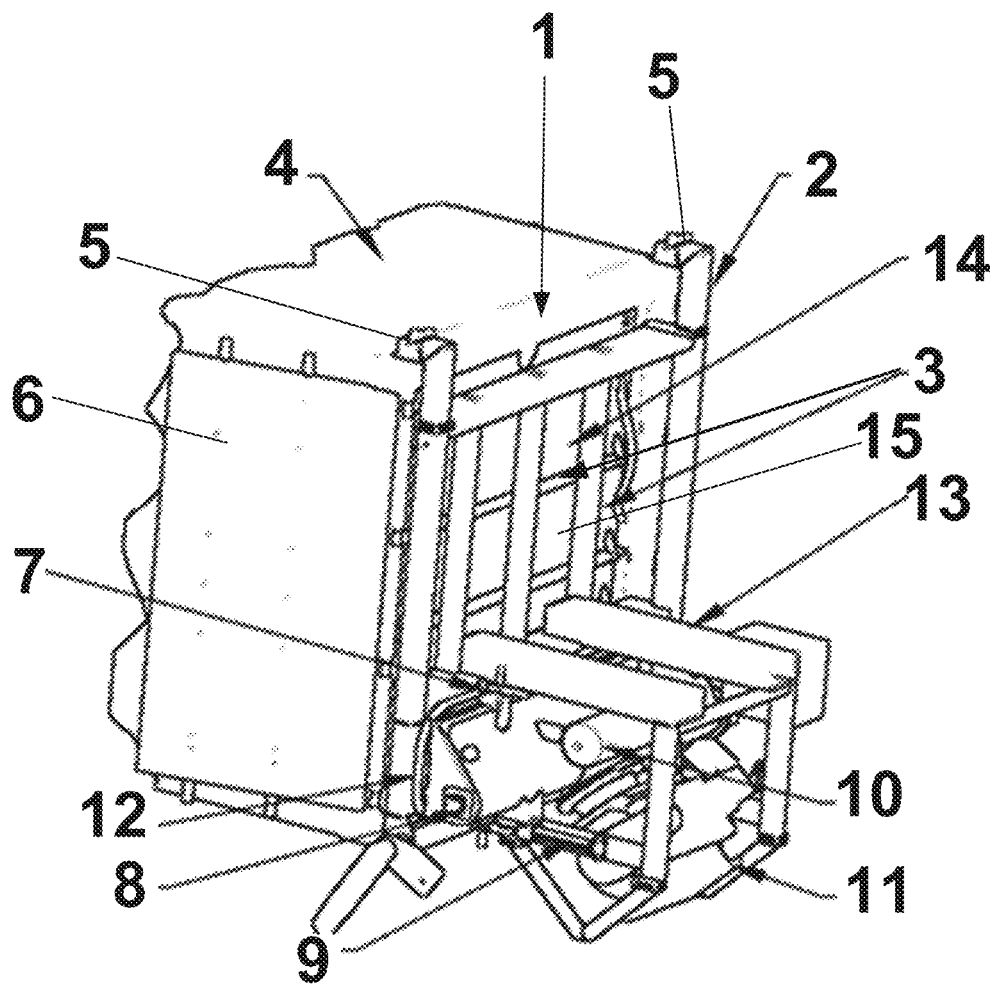
FIG. 1 shows a perspective view of the unloading device which is mounted on a transport vessel to be emptied of the bulk material and FIG. 2 shows a perspective view of the rear wall of a container liner, which is inserted in the transport vessel to be unloaded.

The unloading system for bulk material described below comprises first of all an unloading device 1 according to FIG. 1. Said device includes a basic frame 2 which carries the unloading device 1. The basic frame 1 includes in option an auxiliary frame or a cross standby system 3 and is here fixed to a transport vessel to be unloaded 4, here for example by means of a container connection 5 to a container, when the doors 6 thereof are open. To protect the operator against any injuries, the auxiliary frame 3 can be folded, locked, retracted or pivoted. But the purpose of the auxiliary frame 3, once fastened, is always to keep the operator away from the flow of merchandise once the transport vessel 4 has been opened. The basic frame 2 also provides an additional protection in case bulk material remains suspended at the rear end of the transport vessel 4 to be unloaded, after tilting said container, and in case said material should come loose jerkily in the discharge direction, later on during the unloading process.

A screw trough 7 with worm drive 8, a trough which can be shifted and locked horizontally with respect to the unloading opening of the transport vessel 4, with which the bulk material is unloaded from the transport vessel 4. Moreover, a guide 9 is arranged on the basic frame 2, a guide on which the screw trough 7 is mounted mobile horizontally.

A bulk shocker 10 is provided on the screw trough 7, with the task of generating a sudden pressure change in the transport vessel, in combination of a lock which triggers the pressure compensation mentioned below. The bulk material is lifted from the bottom of the transport vessel 4 so as to influence positively the discharge of the bulk material, in particular with self-compacting materials. This is achieved by applying air by pulses, at a given pace or continuously.

A dosing device 11 is mounted on the basic frame 2 as a discharge fixture, a dosing device which improves the flow characteristic of the bulk material. Such a dosing device 11 can be for instance a rotary feeder, a double-flap batching valve, a suction shoe, a pressurised source vessel or similar. The bulk material to be delivered is dosed by adapting the speed of the conveyor system, for instance by means of the rotary feeder. Freefall emptying is also possible without the conveying systems mentioned. All the electrical and mechanical accessories 7, 8, 11 are continuously adjustable.

Moreover, the sealed surface can be optimised over the full width of the transport medium to be unloaded, in the form of a dust seal 12 made of rubber material, which is pressurised or depressurised, as well as automatically adapting, for emission-free or contamination-free connection to a transport vessel 4. To do so, the dust seal 12 is arranged between the screw trough 7 and the unloading opening of the transport vessel 4.

Transport brackets 13 for forklift trucks, for example pallet transporters, can be mounted on the unloading device 1 for easy connection thereof to the transport vessel 4 to be unloaded, so that said unloading device 1 can be pushed in or suspended to the chassis of a lorry carrying the transport vessel to be unloaded.

Figure 2:
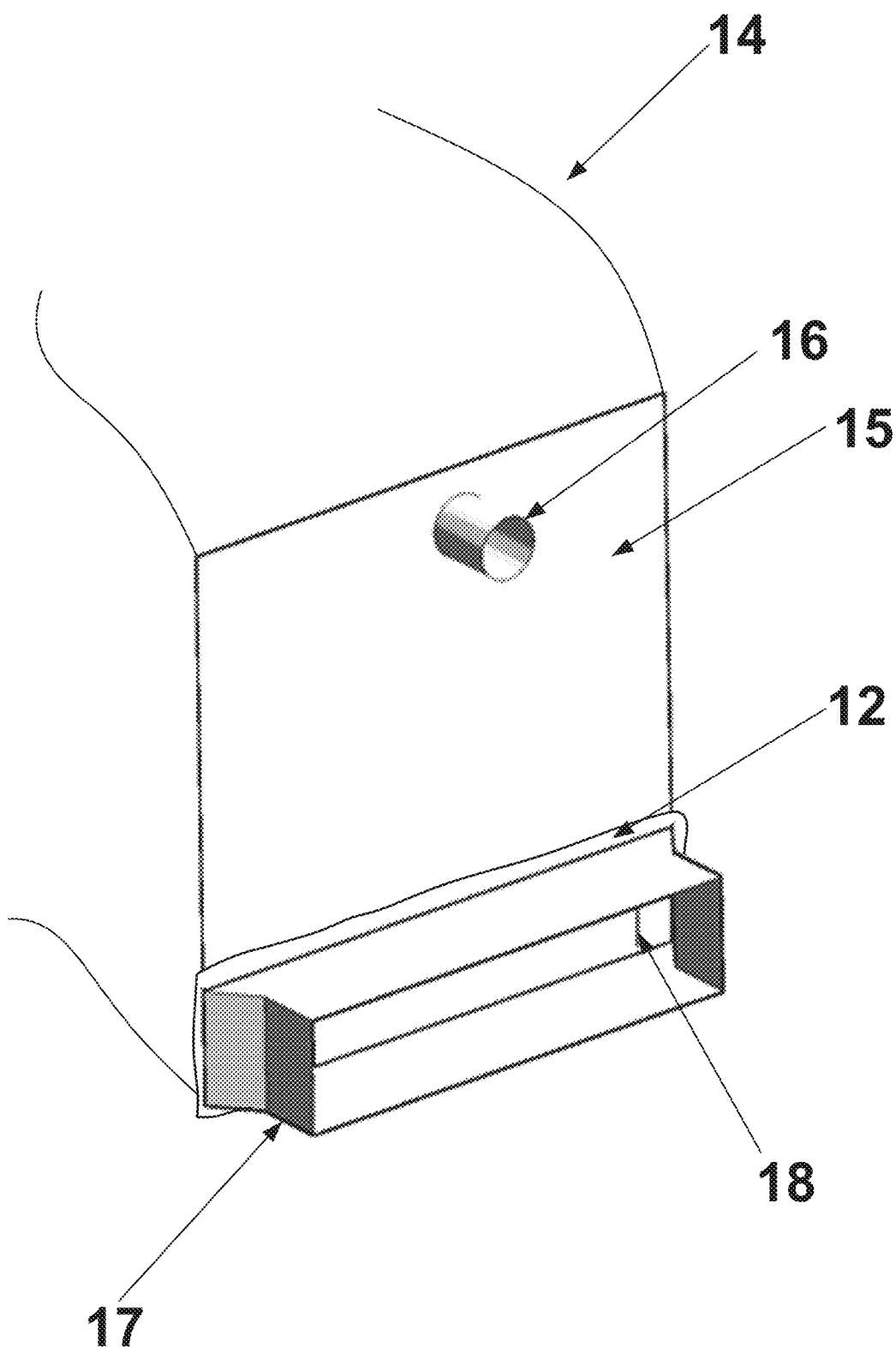
Figure 3:
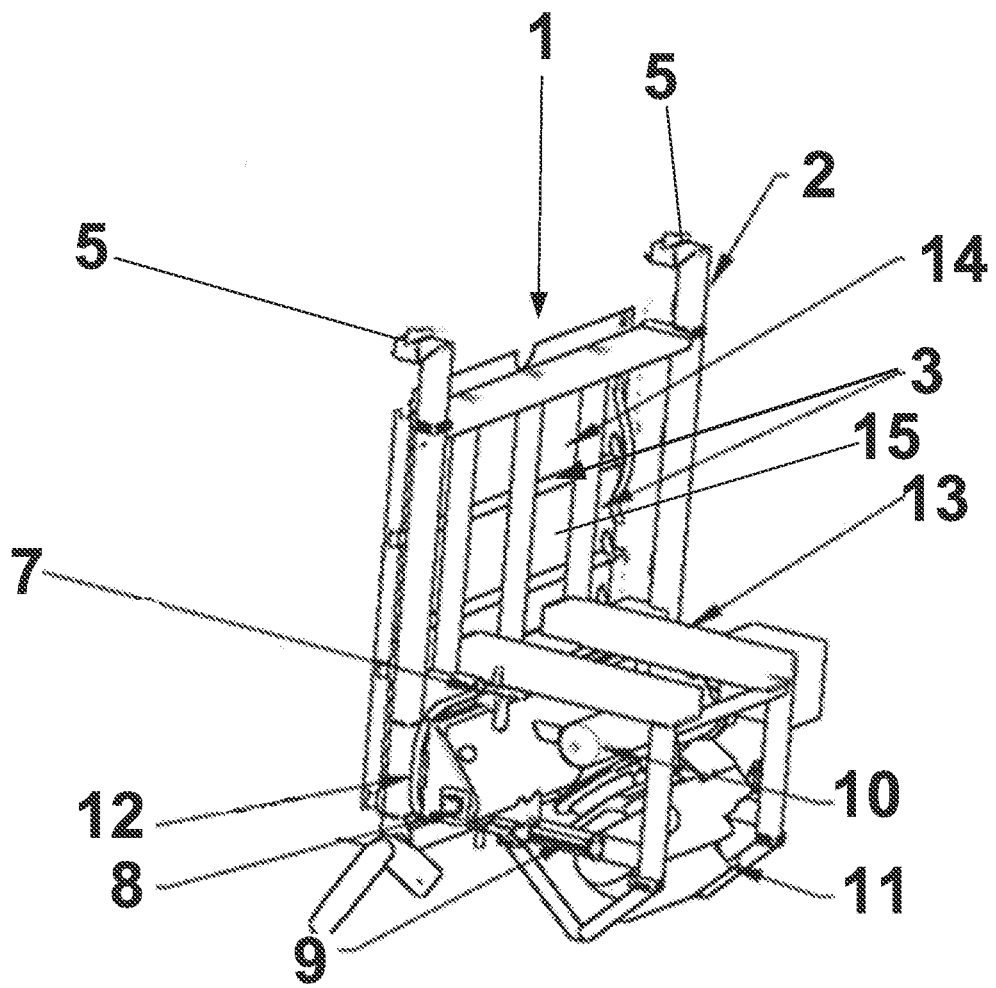
FIG. 3 shows a perspective view of the unloading device alone.

A container liner 14 filled with a bulk material to be unloaded and made of a flexible synthetic material is placed in the transport vessel 4. FIG. 2 illustrates in particular the rear wall 15 of the container liner 14. Said rear wall 15 can also be fixed separately and individually on a transport vessel 4 including no container liner and is not illustrated again.

The rear wall 15 of the container liner 14 possesses moreover a filling spout 16 for bulk material on its upper side. A flexible discharge device 17 is provided in the lower section of the rear wall 15. Furthermore, the flexible discharge device 17 possesses an opening device 18 which is designed as a rip cord.

Fastening the unloading device 1 to the transport vessel 4 to be unloaded enables dust-proof connection of the flexible discharge device 17 to the rear wall 15 of the container liner 14 with the dust seal 12 of the unloading device 1, thereby to obtain a dual gasket. Once the dual gasket is provided, the opening device 18, i.e. the rip cord, is pulled from outside so that the bulk material is released into the screw trough 7 for contamination-free and emission-free unloading from the container liner 14.

The container liner 14 is pressurised pneumatically to press against the inner walls of the transport vessel 4 and the pressure prevents the formation of folds. It is necessary to guarantee process reliability of the unloading. The formation of folds can be prevented by a self-adhesive container liner 14 which is applied to the inner walls of the transport vessel 4.

The bulk material can now flow out through the discharge device 17 into the screw trough 7. The worm drive 8 conveys the bulk material up to the centre. The worm drive 8 also enables to crush of sewage sludges or formed clumps for instance in all sizes of solids during the unloading process from the transport vessel 4. The solid and liquid components can be separated as well as according to their grain sizes during the unloading process. Separate components, i.e. segregated grain sizes, can be re-mixed or segregated before or during the unloading process in the transport vessel 4.

The screw trough 7 is re-closed and locked when the bulk material to be unloaded is discharged from the container liner 14 by means of the unloading device 1.

Fluidisation lances (not represented more in detail) can also be inserted into the bulk material once the container liner has been opened.

LIST OF REFERENCE NUMERALS

1 Unloading device
2 Basic frame
3 Auxiliary frame, etc. Cross standby system
4 Transport vessel
5 Container connection
6 Container door
7 Screw trough
8 Worm drive
9 Guide
10 Bulk shocker
11 Dosing device
12 Dust seal
13 Transport bracket
14 Container liner
15 Rear wall
16 Filling spout 17 Discharge device
18 Opening device

The invention claimed is:

1. An unloading system for bulk material from a transport container (4) into a silo or into another hopper, having an unloading device (1) with a basic frame (2) and an auxiliary frame (3), whereas the basic frame (2) can be fixed to the transport container (4) to be unloaded, and a screw trough (7) with worm drive (8) that can be shifted and locked horizontally with respect to an unloading opening of the transport container (4) is provided on the basic frame (2), wherein a dosing device (11), which provides pressure compensation and which adapts the speed of a conveyor system, is arranged on the screw trough (7) for dosing the bulk material to be delivered, and a dust seal (12) that is pressurized or depressurized, said dust seal forming a double seal and hermetically locked transfer area in combination with a flexible discharge device, is arranged between the screw trough (7) and the unloading opening of the transport container (4),
wherein the unloading device (1) is connected to the transport container (4) to be unloaded in such a way that the pressurizable dust seal (12) of the unloading device (1) is linked in a dust-tight manner to a separate single wall (15) with said flexible discharge device (17) that is fixed to an opening of the transport container (4).

2. The unloading system according to claim 1, wherein the screw trough (7) is arranged to be tiltable or pivotable with respect to a guide (9).

3. The unloading system according to claim 2, wherein the unloading device (1) is fixed to the transport container (4) to be unloaded and the movement of the screw trough (7) is performed pneumatically, electrically or mechanically or in any combination with respect to the guide (9).

4. The unloading system according to claim 1, wherein the flexible discharge device (17) includes an opening device (18) which is designed as a rip cord or a zip fastener.

5. The unloading system according to claim 1, wherein the dosing device (11) for dosing the bulk material to be delivered is designed for easier delivery as a rotary feeder, a double-flap batching valve or a suction shoe.

6. The unloading system according to claim 1, wherein the dust seal (12) is a depressurising gasket.

7. The unloading system according to claim 1, wherein the flexible discharge device is comprised of a double wall for single use.

8. The unloading system according to claim 1, wherein the dust seal is comprised of a pressurized gasket made of hollow rubber.

9. The unloading system according to claim 1, wherein a bulk shocker is provided on the screw trough, enabling a sudden pressure change in the transport container.

* * * * *